US011338159B2

(12) United States Patent
Forsyth

(10) Patent No.: US 11,338,159 B2
(45) Date of Patent: May 24, 2022

(54) FIRE DETECTION IN THERMAL IMAGES

(71) Applicant: The United States of America as Represented by the Secretary of Agriculture, Washington, DC (US)

(72) Inventor: William Forsyth, Boise, ID (US)

( * ) Notice: Subject to any disclaimer, the term of this patent is extended or adjusted under 35 U.S.C. 154(b) by 1087 days.

(21) Appl. No.: 15/597,666

(22) Filed: May 17, 2017

(65) Prior Publication Data

US 2021/0308505 A1 Oct. 7, 2021

(51) Int. Cl.
| | |
|---|---|
| *G06K 9/00* | (2022.01) |
| *A62C 3/02* | (2006.01) |
| *G06T 7/70* | (2017.01) |
| *G06K 9/62* | (2022.01) |

(52) U.S. Cl.
CPC .......... *A62C 3/0271* (2013.01); *G06K 9/6267* (2013.01); *G06T 7/70* (2017.01); *G06T 2207/10032* (2013.01); *G06T 2207/10048* (2013.01); *G06T 2207/30181* (2013.01)

(58) Field of Classification Search
CPC ...... A62C 3/0271; G06K 9/6267; G06T 7/70; G06T 2207/10032; G06T 2207/10048; G06T 2207/30181; G06V 10/143; G06V 20/188

See application file for complete search history.

(56) References Cited

U.S. PATENT DOCUMENTS

| | | | |
|---|---|---|---|
| 4,639,598 A | | 1/1987 | Kern et al. |
| 4,785,292 A | | 11/1988 | Kern et al. |
| 5,049,756 A | | 9/1991 | Brown de Colstoun et al. |
| 5,447,786 A | * | 9/1995 | Rose ........................ C04B 35/50 428/917 |
| 5,850,182 A | * | 12/1998 | Schuler ................... G08B 17/12 250/339.15 |
| 7,541,938 B1 | * | 6/2009 | Engelhaupt ............ G08B 17/12 340/600 |
| 8,369,567 B1 | * | 2/2013 | Buck ....................... G06V 20/13 382/165 |
| 2009/0252196 A1 | * | 10/2009 | Icove .................... G01K 11/006 374/122 |
| 2011/0155397 A1 | * | 6/2011 | Icove ..................... G08B 17/12 169/16 |
| 2017/0108381 A1 | * | 4/2017 | Waldron .............. G08B 29/185 |

(Continued)

FOREIGN PATENT DOCUMENTS

CN 201885804 U 6/2011

*Primary Examiner* — Howard D Brown, Jr.

(57) ABSTRACT

One or more thermal images containing pixel-by-pixel radiation intensity data in two or more wavelength bands can be processed to accurately determine the location of fire within the image(s), regardless of the radiation-scattering effects of smoke. First, all pixels having radiation intensities above a fire threshold in the longer-wavelength band are classified as being aflame. Second, a threshold curve defining a fire threshold in the shorter-wavelength band is applied to the pixels, and those having radiation intensities above the fire threshold in the shorter-wavelength band are classified as being aflame. Third, at least the second group of pixels above is tested to see if each pixel classified as being aflame is part of a group of adjoining pixels which were all classified as being aflame, and if so, each such pixel is reclassified as not being aflame unless it also falls within the first group of pixels above.

20 Claims, 3 Drawing Sheets

(56) References Cited

U.S. PATENT DOCUMENTS

| | | | |
|---|---|---|---|
| 2020/0348446 A1* | 11/2020 | Tremsin | G06T 5/50 |
| 2021/0286999 A1* | 9/2021 | Raucher | B64C 39/024 |
| 2021/0308505 A1* | 10/2021 | Forsyth | G06T 7/70 |

* cited by examiner 8-12 μm 8-12 μm 3-5 μm 3-5 μm

FIRE DETECTION IN THERMAL IMAGES

FIELD OF THE INVENTION

This document concerns an invention relating generally to fire detection, and more specifically to automated fire detection from thermal imaging data.

BACKGROUND OF THE INVENTION

Thermal imaging has been used to image and map forest fires by the US Forest Service since the 1970s. This has traditionally been done via aircraft-borne imaging systems, though land-based (e.g., from a vantage point) or satellite-based imaging may also be feasible. A common arrangement images an area containing fire, or which is suspected of containing fire, in one or more infrared bands, often in the 3-5 um and 8-12 um thermal infrared bands. These bands are typically chosen because longer wavelengths of radiant energy experience less scattering from smoke and particulates, and thus these bands—which have longer wavelengths than visible light—allow imaging of fires that are completely obscured by smoke. Additionally, atmospheric absorption of infrared energy is relatively weak at these bands, and thus radiant areas (e.g., fires) can be distantly imaged with minimal attenuation. The 3-5 um band corresponds to peak spectral emissions from objects at temperatures of 900 K (roughly the temperature of smoldering combustion), making the 3-5 um band particularly useful for detecting the radiant energy emitted from fire. The 8-12 um band corresponds to peak spectral emissions from objects at temperatures of 300 K, making this band particularly useful for imaging background features such as terrain, roads, trees and water bodies that vary in temperature by only a few degrees Fahrenheit.

Prior methods of automatic fire detection have analyzed the resulting images using a curve fit to background thermal energy; see, e.g., Hirsch, S. N., "Application of Infrared Scanners to Forest Fire Detection," NASA, Washington Intern. Workshop on Earth Resources Surv. Systems, Vol. 2; p 152-169 (1971). Using both 3-5 um and 8-12 um bands allows the detection of heat sources smaller than the optical resolution of the system, such as a small camp fire in a cool meadow, while rejecting large warm bodies. A large warm body such as a parking lot, rooftop, or rocky outcropping will emit more energy in the 3-5 and 8-12 um bands than a small camp fire in a large cool meadow. It is therefore impossible to use a single channel to detect the camp fire in the cool meadow, while at the same time rejecting the large warm parking lot, because the single-channel fire threshold (the detected radiation level indicative of fire) must be set above the radiation level of the parking lot—which is already greater than the signal from the camp fire in the meadow. By simultaneously using two bands with a curve fit to the background temperatures, sub-pixel heat can be detected as a change in the relationship of the two channels to each other, i.e., the sample of a cool meadow with a camp fire will sit above the curve fitted to uniform background of varying temperature.

The foregoing technique is useful when there are only small isolated fires to detect, but problems arise when there are small fires in the presence of large intense fires. Referring to FIGS. 1A-1D, FIGS. 1A and 1C illustrate thermal images of an area in the 3-5 and 8-12 um bands. FIGS. 1B and 1D then show these same images with each band's fire threshold applied, such that the subsections (pixels) of the area (image) having radiation intensity above the fire threshold—that is, those classified as aflame—are shown in white, and the subsections (pixels) classified as non-flaming are shown in black. Note in FIGS. 1A and 1B (particularly FIG. 1B) that small white "specks" are scattered about the large regions classified as aflame; these represent isolated small fires. However, the large flaming regions are deceptive: in the 3-5 um band, airborne smoke and other particulates can scatter infrared radiation. Scattering is greater at shorter wavelengths, and with greater amounts and sizes of particulates, and thus the shorter-wavelength 3-5 um band is particularly affected by scattering around large intense fires, where smoke and particulates are most intense. This scattered radiation has the same spectral signature as true fire, making it impossible to determine the true boundaries of the large flaming regions. Thus, the 3-5 um images, while allowing accurate detection of small isolated fires, do not allow determination of the true boundaries of larger fires, and human interpretation by experienced personnel is needed to define the fire perimeter. Conversely, the 8-12 um band (FIGS. 1C-1D) is less affected by scattering in and around larger fires, so the boundaries of the large flaming regions can be accurately discerned. However, isolated small fires are lost. But these isolated small fires are important: if fire remediation efforts are directed only to large flaming regions, the small fires will spread. It would therefore be useful to have a method for accurately determining fire boundaries of both large flaming regions and small isolated fires from thermal images.

BRIEF DESCRIPTION OF THE DRAWINGS

FIGS. 1A-1D are thermal images of an area, wherein FIG. 1A depicts the area in the 3-5 um wavelength band; FIG. 1B shows the image of FIG. 1A after application of a 3-5 um fire threshold (whereby the white subsections/pixels are classified as being aflame); FIG. 1C depicts the area in the 8-12 um wavelength band; and FIG. 1D shows the image of FIG. 1C after application of an 8-12 um fire threshold (whereby the white subsections/pixels are classified as being aflame).

DETAILED DESCRIPTION OF EXEMPLARY VERSIONS OF THE INVENTION

The invention contemplates the use of a thermal image of an area, or of thermal images of the area, wherein each subsection (pixel) within the area (the image(s)) has coordinates (e.g., X and Y coordinates, or latitude and longitude), as well as thermal radiation intensity values measured at the coordinates. These radiation intensity values are in at least two bands: a shorter-wavelength band (such as the 3-5 um band), and a longer-wavelength band (such as the 8-12 um band). FIG. 2 provides an exemplary plot of radiation intensities in the 3-5 um band versus radiation intensities in the 8-12 um band for each subsection/pixel within an area/image, such as the area/image of FIGS. 1A and 1C. To better understand the range of the data in FIG. 2, FIG. 3 then illustrates those subsections of FIG. 2 which have the maximum 3-5 um radiation intensity for each value (or interval of values) of 8-12 um radiation intensity (note that some 3-5 um radiation intensity values at longer-wavelength 8-12 um radiation intensities are outside the range of the chart). Similarly, FIG. 4 illustrates those subsections of FIG. 2 which have the minimum 3-5 um radiation intensity for each value (or interval of values) of 8-12 um radiation intensity.

Figure 1D:
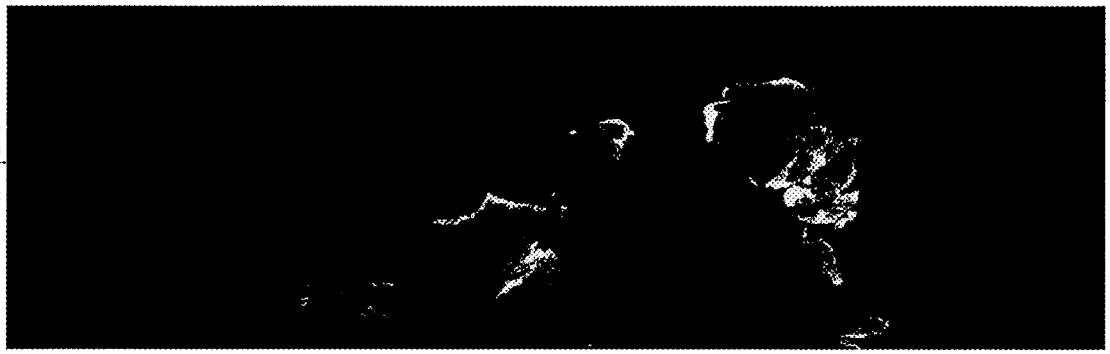
Figure 2:
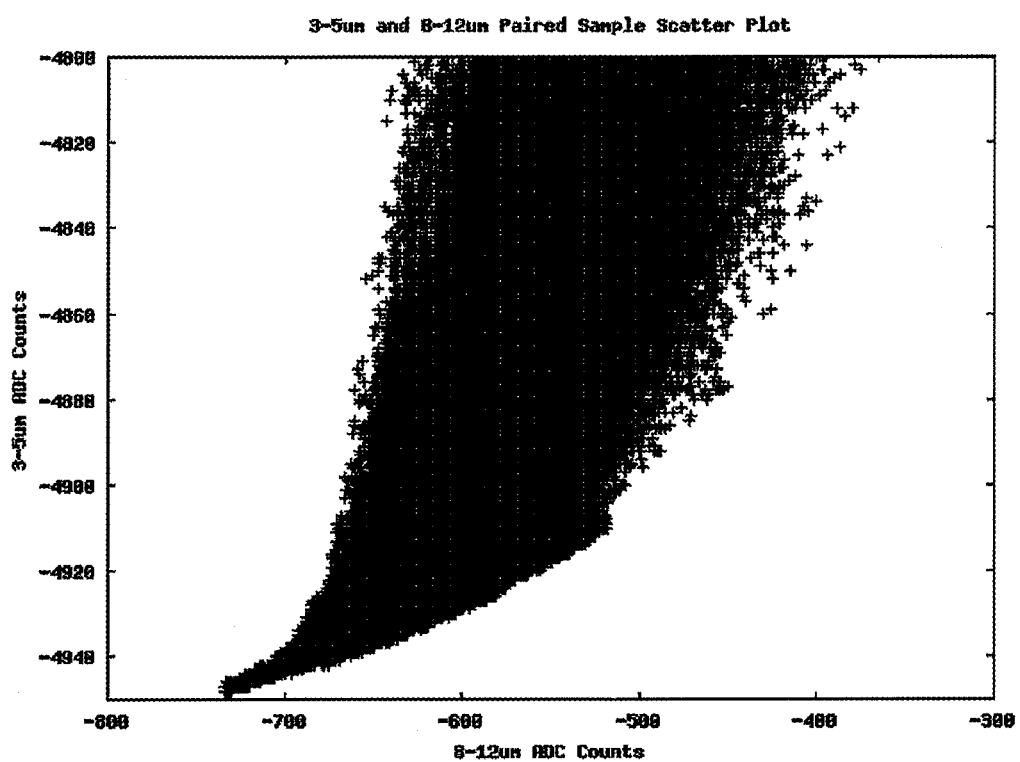
FIG. 2 is a plot, for each subsection/pixel in FIGS. 1A-1D, of the measured radiation intensity in the 3-5 um wavelength band versus the measured radiation intensity in the 8-12 um wavelength band.
Figure 3:
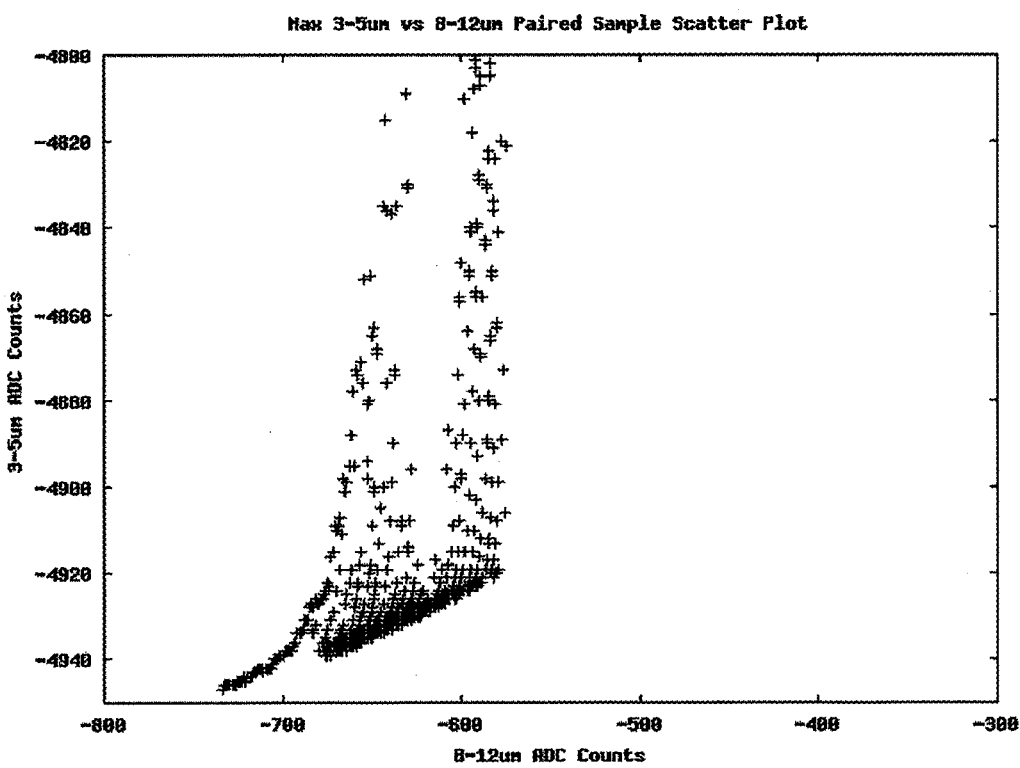
FIG. 3 is a plot of those subsections/pixels of FIG. 2 which have the maximum measured 3-5 um radiation intensity for each value (or interval of values) of measured 8-12 um radiation intensity.
Figure 4:
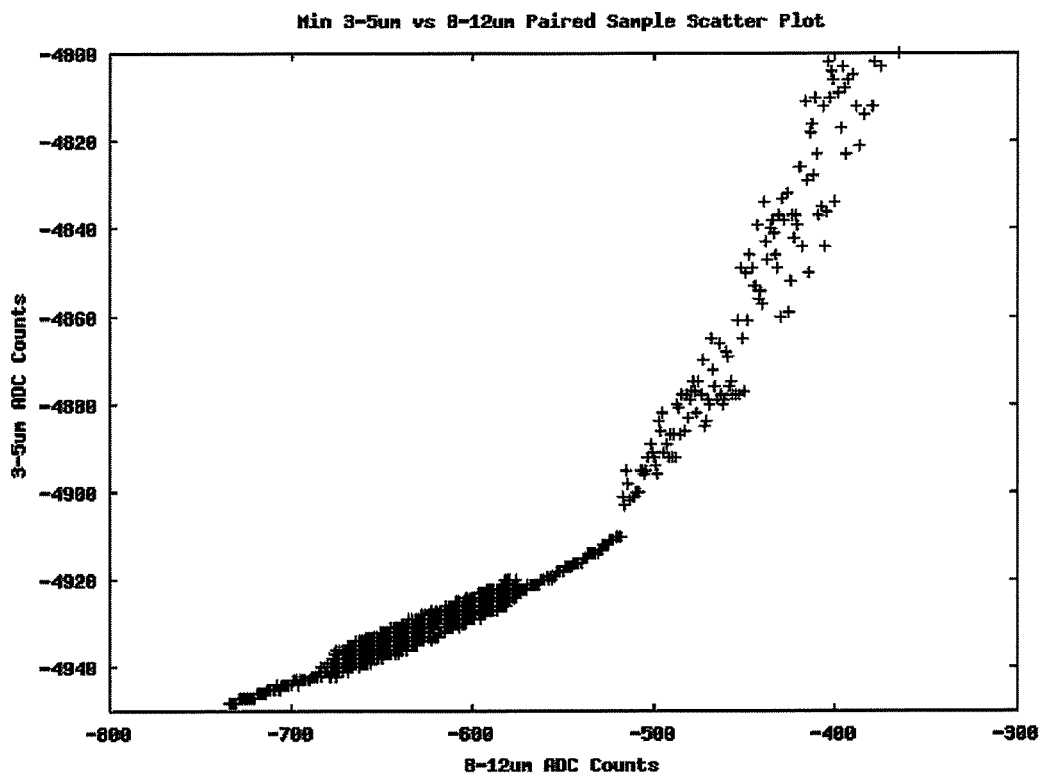
FIG. 4 is a plot of those subsections/pixels of FIG. 2 which have the minimum measured 3-5 um radiation intensity for each value (or interval of values) of measured 8-12 um radiation intensity.
Figure 5:
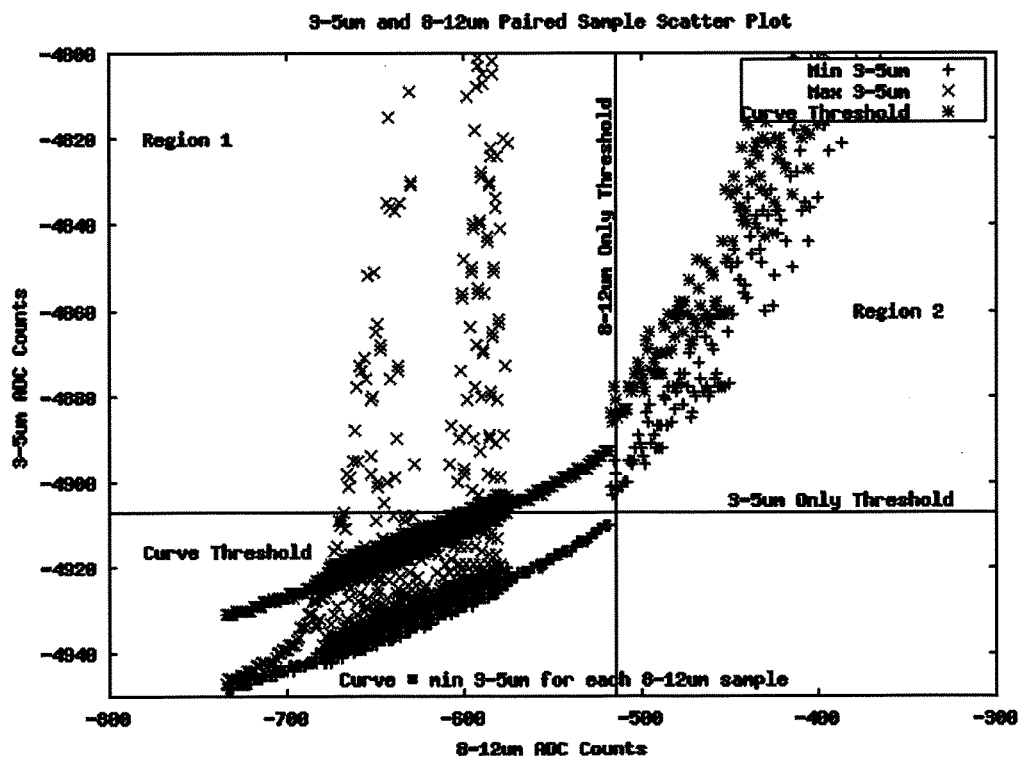
FIG. 5 superimposes the plots of FIGS. 3-4, and also depicts 3-5 um and 8-12 um fire thresholds, as well as a threshold curve.

FIG. 5 then superimposes FIGS. 3-4, depicting both minimum and maximum 3-5 um radiation intensities for each value (or interval of values) of 8-12 um radiation intensity, as well as illustrating fire thresholds for each of the 3-5 um and 8-12 um bands (depicted as a horizontal line around −4905 counts for the 3-5 um band, and a vertical line around −520 counts for the 8-12 um band). Application of these fire thresholds yields results such as those shown in FIGS. 1B and 1D, as discussed above. FIG. 1B depicts all subsections/pixels in FIG. 5 which are classified as aflame following application of the 3-5 um threshold (i.e., all subsections/pixels above the horizontal 3-5 um threshold line). Comparing to the 8-12 um image of FIG. 1D, FIG. 1B is seen to capture isolated fires, but has obscured fire perimeters around larger fires. FIG. 1D depicts all subsections/pixels in FIG. 5 which are classified as aflame following application of the 8-12 um threshold (i.e., all subsections/pixels to the right of the vertical 8-12 um threshold line). Comparing to FIG. 1B, FIG. 1D shows good results around large intense fires, but misses isolated fires (the subsections/pixels in the upper left part of FIG. 5). Each threshold thus has associated advantages and disadvantages. The disadvantages cannot be eliminated by simply applying both thresholds, that is, by classifying only those subsections/pixels above both of the 3-5 um and 8-12 um fire thresholds as aflame (i.e., those subsections/pixels in FIG. 2 which rest in the upper right quadrant of FIG. 5). The results will suffer from the disadvantages discussed above, namely, some subsections/pixels having isolated fire may be missed, and non-flaming subsections/pixels about larger fires may be included. These disadvantages are increased if we instead classify all subsections/pixels passing either fire threshold, rather than both fire thresholds, as being aflame; doing so will also classify any pixels in FIG. 2 which rest in the upper left and lower right quadrants of FIG. 5 as being aflame.

The deficiencies of the foregoing threshold application methods can be reduced or eliminated by selective application of the thresholds, whereby different thresholds may be applied to different regions of a fire. If a region contains only isolated fires, a more aggressive threshold for fire detection can be used at that region. Alternatively, if a region contains a large fire, a less sensitive threshold can be used at that region. This allows isolated fires to be detected while discriminating against scattered infrared energy around large fires, resulting in a better representation of the fire boundaries.

The following steps can be taken to refine the fire classification. First, those subsections/pixels above the 8-12 um fire threshold can be classified as being aflame. Recall from FIG. 1D that this tends to incompletely represent the number of subsections/pixels which are truly aflame, particularly insofar as this tends to miss isolated small fires.

Secondly, a threshold curve is determined which defines a relationship between the shorter-wavelength radiation intensities and the longer-wavelength radiation intensities for at least some of the subsections/pixels, and wherein shorter-wavelength radiation intensity values exceeding those defined by the threshold curve are regarded as being indicative of fire. FIG. 5 illustrates such a 3-5 um threshold curve, wherein subsections/pixels having 3-5 um radiation intensity values above the curve are regarding as being indicative of fire. The 3-5 um threshold curve can be defined in a variety of ways, for example, by use of experimental data, or by adaptation of the 3-5 um "max curve" of FIG. 3, and/or by adaptation of the 3-5 um "min curve" of FIG. 4. Note from FIG. 4 that the min curve is a fairly continuous curve (save for a discontinuity around −520 counts along the 8-12 um intensity axis, above which the data gets noisier), and can be well-modeled by simple curves (e.g., quadratic or exponential functions). Thus, for sake of simplicity, FIG. 5 defines the 3-5 um threshold curve by simply increasing the 3-5 um "min curve" of FIG. 4 by 25%. In other words, subsections/pixels having 3-5 um radiation intensity values which are 25% or more greater than the value of the "min curve" of FIG. 4 are regarded as being aflame. (A percentage different from 25% might be used, with values between 25% and 50% typically being suitable.)

Applying the two foregoing steps classifies all subsections/pixels in FIG. 2 which are above the curve threshold of FIG. 5, and to the right of the 8-12 um fire threshold of FIG. 5, as being aflame. These steps identify all subsections/pixels in the image that (presumably) contain fire. However, some of the subsections/pixels classified as being aflame by application of the 3-5 um fire threshold may not in fact be aflame; they may have merely been classified as being aflame owing to the aforementioned infrared scattering arising from smoke and particulates. To eliminate these falsely-classified subsections/pixels, each subsection/pixel classified as being aflame can be analyzed to see if it is part of a larger group of adjacent subsections/pixels classified as being aflame (i.e., if it is part of one of the large "blobs" in FIGS. 1A-1B which are classified as being aflame). If so, it can be regarded as an "uncertain" subsection/pixel—one whose status as aflame or not aflame is uncertain—and the 8-12 um fire threshold can be applied to classify it as aflame or not aflame. In essence, this takes the large "blobs" in FIGS. 1A-1B, whose fire status is uncertain, and applies the classification test of FIGS. 1C-1D. A preferred arrangement is to consider whether each subsection/pixel classified as being aflame is part of a group of X adjacent subsections/pixels classified as being aflame (i.e., if it is part of one of the large "blobs" in FIGS. 1A-1B which are classified as being aflame), with 20 typically being a suitable value for X (though other values can be used). Thus, if a subsection/pixel is within a group of at least 20 subsections/pixels, wherein each subsection/pixel within the group is adjacent to at least one of the other subsections/pixels within the group, or if it is proximate to such a group (e.g., within some user-defined number of pixels away from the group), it can be regarded as an "uncertain" subsection/pixel—one whose status as aflame or not aflame is in question. If this uncertain subsection/pixel is then found to have a 8-12 um radiation intensity greater than the 8-12 um fire threshold, it can be confirmed as aflame, and otherwise it can be reclassified as not aflame.

Figure 1C:
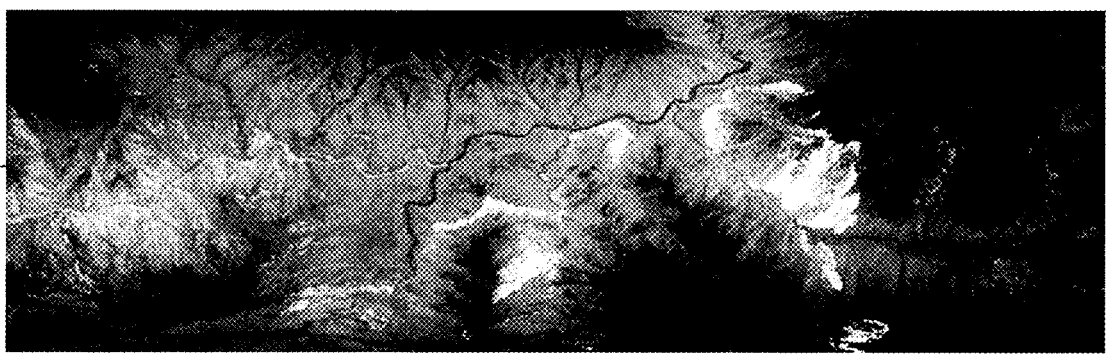
Figure 1B:
Figure 1A:
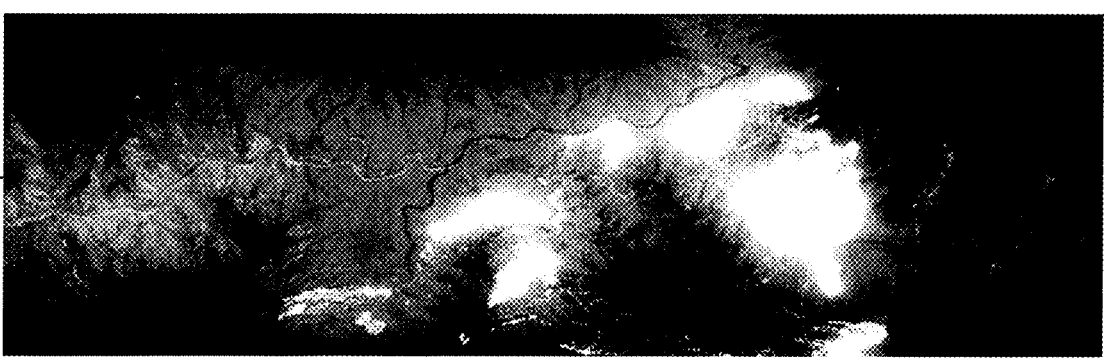

The end result of the foregoing steps—applying the 8-12 um fire threshold, applying the 3-5 um threshold curve, and then eliminating those subsections/pixels classified as being aflame if they are part of (or proximate to) a large group and if they fail to meet or exceed the 8-12 um fire threshold—effectively provides the sensitivity of a 3-5 um threshold as in FIGS. 1A-1B, while "de-smoking" the large blobs of uncertain subsections/pixels in FIGS. 1A-1B as in FIGS. 1C-1D to better characterize the true boundaries of fire therein. This minimizes the need for further field measurements and/or human analysis to identify missed isolated fires, and/or to adjust the defined fire perimeter around large/intense fires. With the resulting information, firefighting personnel can then apply fire remediation measures to the subsections indicated as being aflame, such as airdropping or otherwise applying water or other fire retardants, building firebreaks, and so forth.

With regard to the definition of the shorter-wavelength (e.g., 3-5 um) fire threshold and the longer-wavelength (e.g., 8-12 um) fire threshold, it is noted that construction of a plot of the minimum shorter-wavelength radiation intensity at each value (or interval of values) of longer-wavelength radiation intensity, or conversely of the minimum longer-wavelength radiation intensity at each value (or interval of values) of shorter-wavelength radiation intensity, may help with suitable threshold definition. As discussed above, the resulting min curve can have a discontinuity; this discontinuity can correspond well to the fire thresholds, as seen in FIG. 5. Thus, for example, by moving along the shorter-wavelength (3-5 um) min curve of FIG. 5 as the longer-wavelength (8-12 um) radiation intensity increases from its lowest value, once a discontinuity is encountered, it may be used to define one or both of the shorter-wavelength and longer-wavelength fire thresholds.

However, discontinuities may not be present in all images, in which case fire thresholds can be based on previously-collected images (and previously-determined thresholds), or may be manually determined by simply selecting an arbitrary fire threshold, applying it to the image, and raising or lowering it until the fire threshold provides suitable results. This will typically be apparent: if the selected fire threshold is too low, many subsections/pixels will be classified as aflame, and many of these subsections/pixels will rapidly disappear as the fire threshold is increased to a more appropriate value. A similar process can be used to refine the threshold curve, where the threshold curve is defined as a percentage of (or is otherwise defined by) one or more of the min curve and max curve.

The invention may be implemented on any suitable computing device, including computing devices provided with thermal imaging equipment, and computing devices which merely receive thermal imaging data captured by separate thermal imaging equipment. As example, the invention may be implemented on a personal computer, within the circuitry of an application specific integrated circuit (ASIC), or on or within another programmed or programmable device. In such a case, the invention may be provided as a computer program or other machine-readable instructions which configure a general-purpose computer (e.g., a conventional personal computer, microcontroller, or the like), a special-purpose computer (e.g., an ASIC), or multiple connected computers of either or both types to implement the invention, with the instructions being permanently or temporarily encoded on a non-transitory machine-readable medium such as a disc, tape, chip, or other medium. To illustrate, for sake or portability and ease of use, the invention might be provided as an application running on a mobile telephone, and using thermal imaging data collected by drone aircraft.

While the invention has been described and depicted as used for detection of forest fires, it can be used on other types of fires, for example, for detection of "hot spots" after a home/building fire.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A method for classifying subsections within an area as being aflame, the subsections having associated radiation emission data including:
    A. coordinates for the subsections within the area,
    B. shorter-wavelength radiation intensity measured at each subsection, and
    C. longer-wavelength radiation intensity measured at each subsection,
    the method including the steps of:
    a. defining a longer-wavelength fire threshold, wherein subsections having longer-wavelength radiation intensities above the longer-wavelength fire threshold are classified as being aflame;
    b. defining a shorter-wavelength fire threshold, wherein subsections having shorter-wavelength radiation intensities above the shorter-wavelength fire threshold are classified as being aflame;
    c. reclassifying an aflame subsection as not aflame if:
        (1) the aflame subsection is part of a set of X immediately adjacent aflame subsections, X being a predefined number; and
        (2) the aflame subsection has a longer-wavelength radiation intensity lower than the longer-wavelength fire threshold.

2. The method of claim 1 wherein X is greater than or equal to 20.

3. The method of claim 1 wherein the shorter-wavelength fire threshold is defined by a threshold curve, the threshold curve defining a relationship between the shorter-wavelength radiation intensities and the longer-wavelength radiation intensities for at least some of the subsections.

4. The method of claim 3 wherein the threshold curve defines a relationship between the shorter-wavelength radiation intensities and the longer-wavelength radiation intensities for subsections having shorter-wavelength radiation intensities within the lower 50% of the shorter-wavelength radiation intensities of all subsections having the same longer-wavelength radiation intensity.

5. The method of claim 3 wherein the threshold curve defines a relationship between the shorter-wavelength radiation intensities and the longer-wavelength radiation intensities for subsections having shorter-wavelength radiation intensities within the lower 25% of the shorter-wavelength radiation intensities of all subsections having the same longer-wavelength radiation intensity.

6. The method of claim 1 further including applying fire remediation to at least some of the aflame subsections.

7. The method of claim 1 wherein:
    a. the area is an aerial land image, and
    b. the subsections are pixels within the aerial land image.

8. A method for classifying subsections within an area as being aflame, the subsections having associated radiation emission data including:
    A. coordinates for the subsections within the area,
    B. shorter-wavelength radiation intensity measured at each subsection, and
    C. longer-wavelength radiation intensity measured at each subsection, the method including the step of classifying a subsection as aflame if the subsection fulfills the following conditions:
a. the subsection has a longer-wavelength radiation intensity above a longer-wavelength fire threshold;
b. the subsection has a shorter-wavelength radiation intensity above a shorter-wavelength fire threshold, and
c. the subsection is not a part of a set of X immediately adjacent subsections classified as aflame as per the foregoing conditions a. and b., X being a predefined number, wherein the subsection has a longer-wavelength radiation intensity lower than the longer-wavelength fire threshold.

9. The method of claim 8 wherein the shorter-wavelength fire threshold is defined by a threshold curve, the threshold curve defining a relationship between shorter-wavelength radiation intensities and longer-wavelength radiation intensities for at least some of the subsections.

10. A method for classifying subsections within an area as being aflame, the method including the steps of:
a. collecting radiation emission data across the area, the emission data including:
   (1) coordinates for subsections within the area,
   (2) shorter-wavelength radiation intensity measured at each subsection, and
   (3) longer-wavelength radiation intensity measured at each subsection,
b. defining a longer-wavelength fire threshold, wherein subsections having longer-wavelength radiation intensities above the longer-wavelength fire threshold are regarded as being aflame;
c. fitting a threshold curve defining a relationship between the shorter-wavelength radiation intensities and the longer-wavelength radiation intensities for at least some of the subsections;
d. classifying each subsection having:
   (1) longer-wavelength radiation intensity greater than the longer-wavelength fire threshold, or
   (2) shorter-wavelength radiation intensity greater than that defined by the threshold curve at the subsection's longer-wavelength radiation intensity,
   as being aflame.

11. The method of claim 10 further including the steps of:
a. classifying aflame subsections as uncertain subsections if they are part of a set of X immediately adjacent aflame subsections, X being a predefined number;
b. reclassifying uncertain subsections as not aflame if such uncertain subsections have longer-wavelength radiation intensities lower than the longer-wavelength fire threshold.

12. The method of claim 11 wherein X is greater than or equal to 20.

13. The method of claim 11 further including applying fire remediation to at least some of the aflame subsections.

14. The method of claim 10 wherein, for at least some of the subsections classified as aflame, if such subsections are within a set of immediately adjacent subsections classified as aflame, reclassifying those subsections within the set having longer-wavelength radiation intensity lower than the longer-wavelength fire threshold as not aflame.

15. The method of claim 14 further including applying fire remediation to at least some of the aflame subsections.

16. The method of claim 10 wherein the longer-wavelength fire threshold corresponds to the greatest discontinuity in:
a. a curve defined by a plot of the shorter-wavelength radiation intensity versus the longer-wavelength radiation intensity for at least some of the subsections;
b. as the longer-wavelength radiation intensity increases from its lowest value.

17. The method of claim 16 wherein the curve corresponds to the threshold curve.

18. The method of claim 10 wherein the threshold curve defines a relationship between the shorter-wavelength radiation intensities and the longer-wavelength radiation intensities for subsections having shorter-wavelength radiation intensities within the lower 50% of the shorter-wavelength radiation intensities of all subsections having the same longer-wavelength radiation intensity.

19. The method of claim 10 wherein the threshold curve defines a relationship between the shorter-wavelength radiation intensities and the longer-wavelength radiation intensities for subsections having shorter-wavelength radiation intensities within the lower 25% of the shorter-wavelength radiation intensities of all subsections having the same longer-wavelength radiation intensity.

20. The method of claim 10 wherein:
a. the area is an aerial land image, and
b. the subsections are pixels within the aerial land image.

* * * * *